(12) United States Patent
Reilly (10) Patent No.: US 11,157,602 B2
(45) Date of Patent: Oct. 26, 2021

(54) METHOD AND SYSTEM FOR IDENTIFICATION VERIFICATION FOR MOBILE DEVICES

(71) Applicant: GRAD DNA Ltd., Sevenoaks (GB)

(72) Inventor: Stephen Reilly, Sevenoaks (GB)

(73) Assignee: Grad DNA Ltd., Kent (GB)

( * ) Notice: Subject to any disclaimer, the term of this patent is extended or adjusted under 35 U.S.C. 154(b) by 50 days.

(21) Appl. No.: 16/076,831

(22) PCT Filed: Feb. 10, 2017

(86) PCT No.: PCT/GB2017/050347
§ 371 (c)(1),
(2) Date: Aug. 9, 2018

(87) PCT Pub. No.: WO2017/137764
PCT Pub. Date: Aug. 17, 2017

(65) Prior Publication Data
US 2019/0050549 A1    Feb. 14, 2019

(30) Foreign Application Priority Data
Feb. 10, 2016   (GB) ..................... 1602368

(51) Int. Cl.
*G06F 21/32* (2013.01)
*G06F 21/31* (2013.01)
*G09B 7/02* (2006.01)
*G06Q 50/00* (2012.01)

(52) U.S. Cl.
CPC ............. *G06F 21/32* (2013.01); *G06F 21/31* (2013.01); *G06F 2221/2139* (2013.01); *G06Q 50/01* (2013.01); *G09B 7/02* (2013.01)

(58) Field of Classification Search
CPC ........ G06F 21/31; G06F 21/316; G06F 21/32; G06F 2221/2111; G06F 2221/2133
See application file for complete search history.

(56) References Cited

U.S. PATENT DOCUMENTS

| | | | |
|---|---|---|---|
| 7,222,360 B1* | 5/2007 | Miller | G06F 21/32 709/225 |
| 8,508,338 B1* | 8/2013 | Fiddy | G06F 21/305 340/5.82 |
| 2002/0095586 A1* | 7/2002 | Doyle | G06F 21/32 713/186 |
| 2005/0097364 A1* | 5/2005 | Edeki | G06F 21/552 726/4 |

(Continued)

OTHER PUBLICATIONS

Chao Shen et al, Touch-Interaction Behavior for Continuous User Authentication on Smartphones, IEEE (Year: 2015).*

(Continued)

*Primary Examiner* — Shanto Abedin
(74) *Attorney, Agent, or Firm* — Nixon & Vanderhye, P.C.

(57) ABSTRACT

The present invention relates to a method for identification verification for a device. The method includes the steps of capturing user identity information at a first stage prior to an interaction at the device; capturing user identity information at a second stage following the interaction; and verifying identity during the interaction using the information captured at the first and second stages. A system for identification verification is also disclosed.

17 Claims, 7 Drawing Sheets

(56) References Cited

U.S. PATENT DOCUMENTS

| | | | | |
|---|---|---|---|---|
| 2007/0048723 A1* | 3/2007 | Brewer | ............. | G09B 7/02 |
| | | | | 434/350 |
| 2007/0094717 A1* | 4/2007 | Srinivasan | ............. | H04L 9/32 |
| | | | | 726/5 |
| 2009/0133117 A1* | 5/2009 | Bentley | ............. | H04L 63/0861 |
| | | | | 726/17 |
| 2011/0102142 A1* | 5/2011 | Widger | ............. | G09B 5/06 |
| | | | | 340/5.83 |
| 2011/0223576 A1* | 9/2011 | Foster | ............. | G09B 7/02 |
| | | | | 434/362 |
| 2013/0086670 A1 | 4/2013 | Vangpat et al. | | |
| 2013/0127592 A1 | 5/2013 | Fyke et al. | | |
| 2014/0020089 A1* | 1/2014 | Perini, II | ............. | A61B 5/0484 |
| | | | | 726/19 |
| 2014/0033284 A1 | 1/2014 | Harik et al. | | |
| 2015/0310195 A1* | 10/2015 | Bailor | ............. | G06F 21/316 |
| | | | | 726/6 |
| 2015/0310196 A1* | 10/2015 | Turgeman | ............. | G06F 3/04842 |
| | | | | 726/19 |
| 2016/0019379 A1* | 1/2016 | Sadeh | ............. | G06F 21/32 |
| | | | | 434/362 |
| 2016/0055487 A1* | 2/2016 | Votaw | ............. | G06Q 20/4014 |
| | | | | 705/44 |
| 2016/0057623 A1* | 2/2016 | Dutt | ............. | G06F 3/04883 |
| | | | | 455/411 |
| 2016/0148077 A1* | 5/2016 | Cox | ............. | G06K 9/00288 |
| | | | | 382/159 |

OTHER PUBLICATIONS

International Search Report for PCT/GB2017/050347 dated May 18, 2017, 2 pages.

* cited by examiner

METHOD AND SYSTEM FOR IDENTIFICATION VERIFICATION FOR MOBILE DEVICES

This application is the U.S. national phase of International Application No. PCT/GB2017/050347 filed Feb. 10, 2017 which designated the U.S. and claims priority to GB Patent Application No. 1602368.1 filed Feb. 10, 2016, the entire contents of each of which are hereby incorporated by reference.

FIELD OF INVENTION

The present invention is in the field of identity verification. More particularly, but not exclusively, the present invention relates to verification of user identity for an interaction on a device.

BACKGROUND

Automated identification verification is vital for a number of online activities, such as financial transactions and communications, and important for day-to-day activities, such as in-person transactions, where automation removes the human error factor.

It is of particular importance in the testing or assessment field, where individuals undertake tests or assessments and where those results are used to assign a score or assessment in relation to the individual. Failure to adequately verify the identity of the individual can lead to fraudulent results if an imposter or another individual (e.g. someone hired to take the test in place of the anticipated individual) takes the test.

One example of a testing field is commercial psychometric testing. Originally, when commercial psychometric testing came to market, it was conducted with pencil and paper under controlled conditions. When an individual attended an interview, their identification was shown and verified by the test administrator, and the individual would sit the test. Testing is now often deployed on desktop computers and the administration for the tests may be conducted online by an administrator. The candidate's email, name and other details are recorded and an automatic email is sent to the user with test instructions and a link to the online test. The link is unique (or the link is generic but a unique code is provided) so that the user can access the test(s) to complete within a timescale defined by the test provider for that user.

Unfortunately, a disadvantage with the above system is that Alice interviewing at Bank1 could receive the link and email the link to Bob, who completes the tests in her place with excellent results; Alice then gets an interview or is invited to an assessment centre on the basis of those results. At this point no one knows if Alice completed the tests herself or if someone else did them for her. Desktop testing providers often use a verification method which requires Alice to retest using a verification tool (usually a much shorter test compared to the initial test) while on site at Bank1—the test scores of the initial test and retest are compared and if within a specified percentile of Alice's initial scores, the initial scores are classed as verified. This method acts as some level of prevention, but currently only about 5% of all applicants ever get verified on site, therefore Alice could get the job based on the results of Bob.

There is a desire for an improved verification system, particularly for testing environments.

It is an object of the present invention to provide a method and system for identification verification which overcomes the disadvantages of the prior art, or at least provides a useful alternative.

SUMMARY OF INVENTION

According to a first aspect of the invention there is provided a method for identification verification for a device including:

Capturing user identity information at a first stage prior to an interaction at the device;

Capturing user identity information at a second stage following the interaction; and Verifying identity during the interaction using the information captured at the first and second stages.

The information captured at the first and second stages may be compared to verify identity.

The interaction may be a test executing on the device.

The interaction may be a question within a test executing on the device.

The test may be a psychometric test.

The user identity information captured at the first and second stage may be biometric information.

The biometric information may be one or more of the fingerprint of the user, a photograph or video of the user, or a voice recording of the user.

The method may further including the steps of:

Displaying an alphanumeric, a word or phrase for the user to speak; and

Recording the voice of the user reading the alphanumeric, word or phrase as the biometric information.

The alphanumeric, word or phrase may be randomly generated such as randomly selected from a list, or the alphanumeric, word or phrase may be an answer from the user to a question in a test.

The user identity information captured at the first and second stages may be login credentials for a third party provider. The third party provider may be a social media network.

The method may further include the step of recording the verified identity with the interaction. The recorded verified identity may be stored at a server.

The method may further including the steps of:

capturing user identity information at a third stage; and
verifying identity of the user using information captured at the third stage and information captured at least one of the first or second stages.

The user identity information captured at the third stage may be captured at a second device.

The third stage may occur in a different location to the first and second stages.

The first and second stages may occur proximate in time to the interaction. The third stage may not be proximate in time to the interaction, and may occur before the testing phase, in one embodiment, or after the testing phase in another.

According to a further aspect of the invention there is provided a system for identification verification, including:

A processor configured to capture user identity information prior to an interaction, to capture user identity information following the interaction, and to use the information captured to verify the identity of the user during the interaction; and A memory configured to store the user identity information.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for identification verification.

Figure 1:
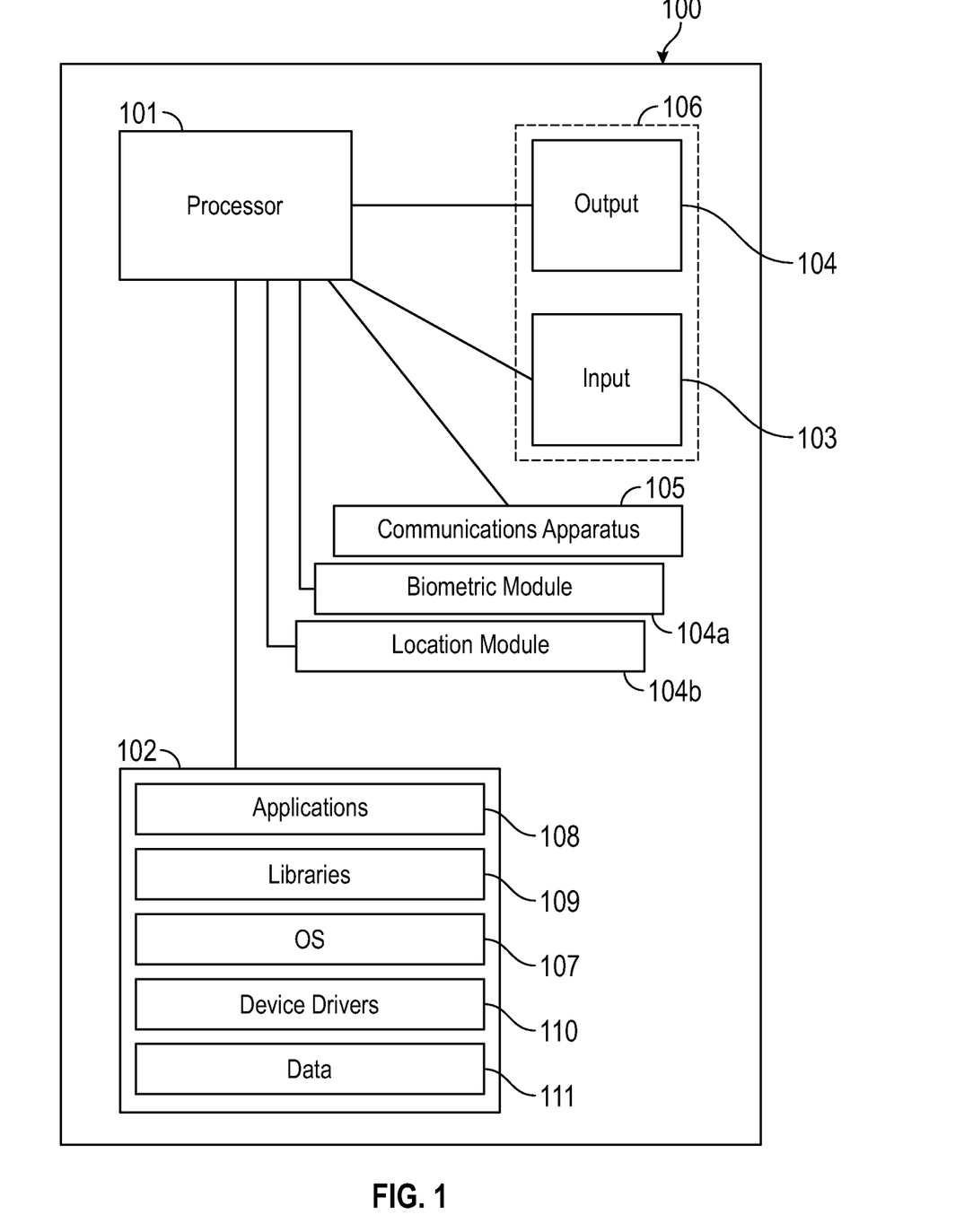
FIG. 1: shows a block diagram illustrating a system in accordance with an embodiment of the invention.

In FIG. 1, a system 100 in accordance with an embodiment of the invention is shown.

The system 100 includes a processor 101, a memory 102, an input apparatus 103, and an output apparatus 104. The system may also include a biometric module 104a, a location module 104b, and a communications apparatus 105.

The input apparatus 103 may include one or more of a touch/near-touch input, an audio input, a keyboard, a pointer device (such as a mouse), or any other type of input. The touch input may include 3D touch.

The output apparatus 104 may include one or more of a digital screen (such as an LED or OLED screen), an e-ink screen, an audio output, haptic output, or any other type of output.

The input and output apparatuses 103 and 104 may form an integrated user interface 106 such as a touch or near-touch screen.

The biometric module 104a may include a fingerprint reader, a camera, a microphone, and/or any other biometric capture apparatus.

The location module 104b may be a GPS, A-GPS, or other geographical location determination/approximation apparatus.

The system 100, or at least parts of the system, constitute a device 100 such as a mobile device (e.g. a smart-phone, a tablet, or a smartwatch). The device 100 may include an operating system 107. For example, if the device 100 is a mobile device, the operating system 107 may be Apple iOS, Google Android, or Microsoft Windows Phone.

The system 100 may be configured to provide multi-functionality such as execution of one or more software applications 108, transmitting and receiving communications (e.g. voice communications, text messages, notifications, or any other network communications), and/or monitoring communications or applications and generating notifications. The multi-functionality may be coordinated by the operating system 107 executing on the device 100.

The processor 101 may be configured to provide a test to the user within a testing phase. The test may be a series of questions generated as one or more outputs via the output apparatus 104 (e.g. the test may be displayed as a series of screens via a display screen or generated as audio questions via an audio output). Provision of the test may include receiving one or more answers from the user to each of the questions via the input apparatus 103 (e.g. receiving selection of displayed options via a touch-screen, receiving specific input via a keyboard, or receiving specific input via an audio input).

In one embodiment, the processor 101 provides the test by execution of a testing application.

Although the interaction has been described as a test for the user, it will be appreciated that, with suitable modification, the system 100 can be adapted to work with other interactions where it would be desirable to verify the identity of the user during the interaction.

The processor 101 may be further configured to capture user identity information before the interaction and to capture user identity information following the interaction. The user identity information may be captured via the biometric module 104a and/or via the input apparatus 103. Additional information may be captured at the point of user identity information capture. For example, location information captured via the location module 104b.

The processor 101 may be further configured to verify the identity of a user during the interaction using the user identity information captured before and after the interaction. The processor 101 may verify the identity at the device, or the processor 101 may verify the identity by communicating with a verification server. The verification server may be an external identity verification server comprising an identity database (such as the DVLA, passport office, etc.).

The memory 102 may be configured to store the software applications 108, libraries 109, the operating system 107, device drivers 110, and data 111. The data 111 may include the captured user identity information. In one embodiment, the data 111 may include the test and answers provided by a user to the test. The software applications 108 may include the interaction application (e.g. the testing application) and one or more third party applications.

The processor 101 is configured to execute the software applications 108, libraries 109, operating system 107, and device drivers 110, and to retrieve data 111.

The communications apparatus 105 may be configured to communicate with one or more other devices or servers via a communications interface such as wifi, Bluetooth, and/or cellular (e.g. 2G, 3G, or 4G) and/or across a network (such as a cellular network, a private LAN/WLAN and/or the Internet). The servers may include third party servers such as a verification server or one or more third party servers, such as social network authentication servers.

Figure 2:
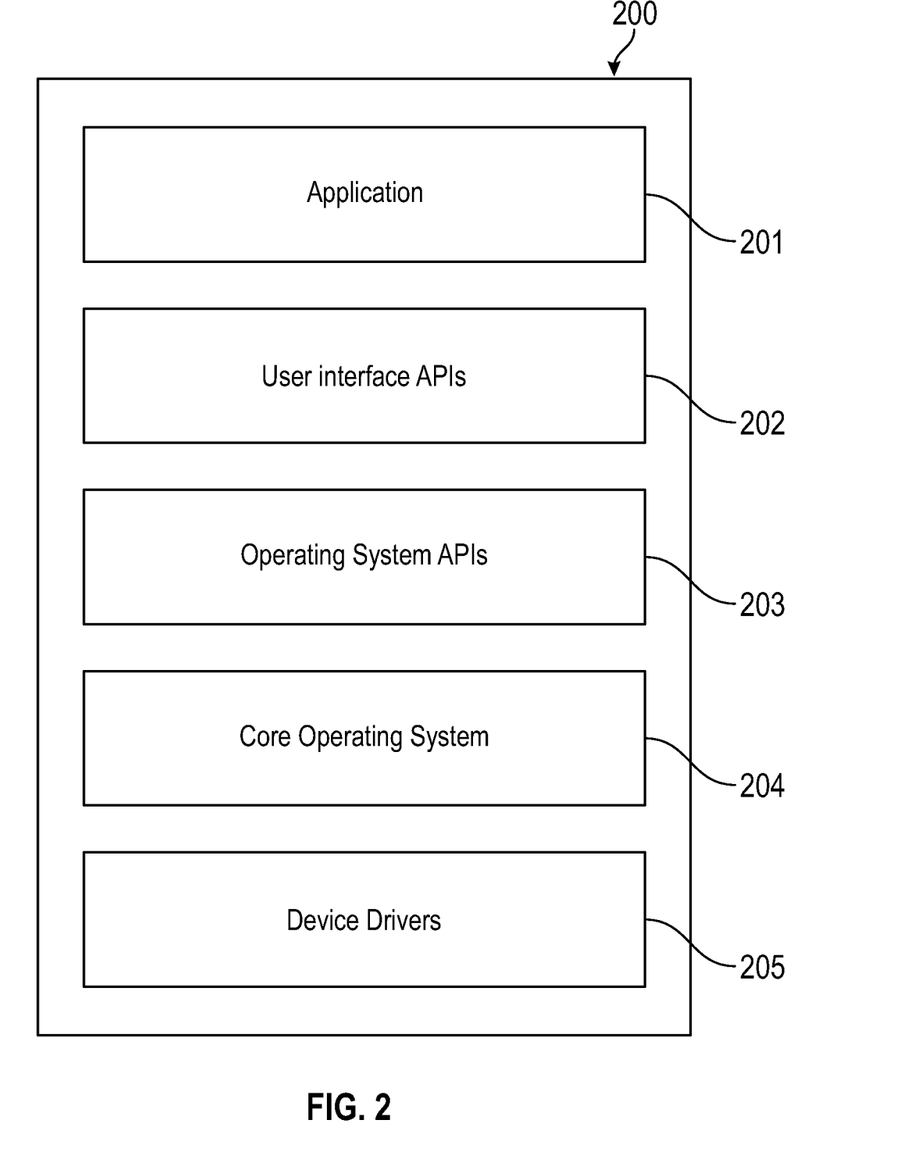
FIG. 2: shows a block diagram illustrating a device software architecture in accordance with an embodiment of the invention.

Referring to FIG. 2, the various layers of the architecture 200 of the device 100 will be described.

Software applications 201 are provided at a top layer. Below this layer are user interface APIs 202 which provide access for the application software 201 to user interface libraries. Below this layer are operating system APIs 203 which provide access for the application software 201 and user interface libraries to the core operating system 204. Below the core operating system 204 are the device drivers 205 which provide access to the input 103, output 104 and communication 105 apparatuses, and the biometric 104a and location 104b modules.

Figure 3:
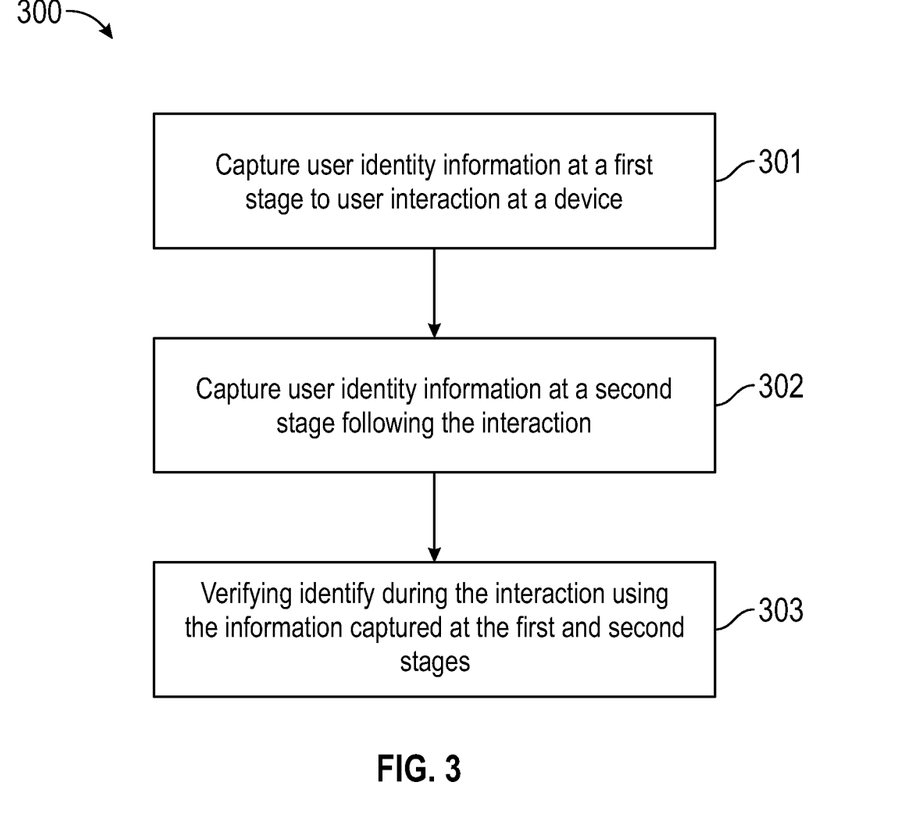
FIG. 3: shows a flow diagram illustrating a method in accordance with an embodiment of the invention.

With reference to FIG. 3, a method 300 in accordance with an embodiment of the invention will be described.

In step 301, user identity information is captured at a first stage prior to an interaction at the device. Capture may occur proximate in time to the interaction. For example, as part of a continuous usage period of the device by the user.

The interaction may be a test involving a series of questions, or the interaction may be a question within a test. For the latter, user identity information may be captured and verified for a plurality of questions in the test. That is, continually verified during the test. The test may be a psychometric test.

In one embodiment, the user identity information includes biometric information such as a fingerprint, audio sample, video of the user, or an image of the user captured via a camera at the device.

When the information is an audio sample, text may be provided to the user to read. The text may be a word, phrase and/or a series of alpha and/or numeric digits. The text may be (pseudo)randomly selected.

In one embodiment, login credentials may constitute the user identity information. For example, the login credentials may be for a third party system such as a social media system.

In one embodiment, personal information known to user, such as name, address information, and/or email, may constitute the user identity information.

The user identity information may be in the original form provided by the user or in post-processed form. For example, in post-processed form, the audio sample may an audio fingerprint, the video/image may be video/image fingerprint, the login credentials may be an authentication token, and personal information may be hashed.

In step 302, user identity information is captured at a second stage following the interaction at the device. Capture may occur proximate in time to the interaction. For example, as part of a continuous usage period of the device by the user.

The user identity information captured may be of the types described in relation to step 301. In one embodiment, the user identity information captured is of the same type as the user identity information captured in step 301.

In step 303, the user identity information captured at the first and second stages are used to verify the identity of the user during the interaction.

In one embodiment, the captured information are compared to verify identity. Successful verification may be established if the two information differ below a specified threshold for the type of information and comparison method.

The user identity information and/or the verification confirmation may be associated with the interaction and/or transferred to a server.

Exemplary pseudo-code for capturing user information at the first and second stage and verifying on an iPhone device is provided below:

```
if (/* User has selected to take a test */) {
    verifyUser(userId,verificationMethod); //1. This
results in verificationData being stored in the session
    //2. setTestEnvironment( );
    //3. Begin test
    //4. As user takes test, associate all test data
points with the verificationData
    //5. User completes test
    verifyUser(userId,verificationMethod); /* This
results in either ...
        (i) userId and all other data points being
associated with the same verificationData - USER TEST
VALID, or
        (ii) userId and all other data points are not
associated with the same verificationData - USER TEST
INVALID */
}
function verifyUser(userId,verificationMethod) {
    var userId = userId;
    var verificationMethod = verificationMethod;
    if(verificationMethod === 'name') {
        //1. Collect user firstname and lastname and
set that as verificationData
        //2. Check verificationData matches the
firstname and lastname for the registered userId
        //3. Check the verificationData matches any
existing verificationData in the session
    } else if(verificationMethod === 'code') {
        //1. Collect code and set that as
verificationData
        //2. Check verificationData matches the code
assigned to the registered userId
        //3. Check the verificationData matches any
existing verificationData in the session
    } else if(verificationMethod === 'social') {
        if(socialNetwork === 'facebook') {
            //1. Ask user to log in via the social
network and, if successful, set the result
verificationData
            //2. Check firstname, lastname and email
contained in verificationData match the firstname,
lastname and email for the registered userId
            //3. Check the verificationData matches
any existing verificationData in the session
        } else if(socialNetwork === 'google') {
            //1. Ask user to log in via the social
network and, if successful, set the result
verificationData
            //2. Check firstname, lastname and email
contained in verificationData match the firstname,
lastname and email for the registered userId
            //3. Check the verificationData matches
any existing verificationData in the session
        } else if(socialNetwork === 'linkedin') {
            //1. Ask user to log in via the social
network and, if successful, set the result
verificationData
            //2. Check firstname, lastname and email
contained in verificationData match the firstname,
lastname and email for the registered userId
            //3. Check the verificationData matches
any existing verificationData in the session
        } else if(socialNetwork === 'twitter') {
            //1. Ask user to log in via the social
network and, if successful, set the result
verificationData
            //2. Check firstname and lastname
contained in verificationData match the firstname and
lastname for the registered userId
            //3. Check the verificationData matches
any existing verificationData in the session
        }
    } else if(verificationMethod === 'photo') {
        //1. Collect photo of user and set that as
verificationData
        //2. Submit verificationData to the biometric
recognition service
        //3. Check the verificationData matches any
existing verificationData in the session
    } else if(verificationMethod === 'voice') {
        //1. Collect photo of user and set that as
verificationData
        //2. Submit verificationData to the biometric
recognition service
        //3. Check the verificationData matches any
existing verificationData in the session
    }
}
```

In one embodiment, a series of multi-choice answers may be presented to the user to read aloud. This sequence may be recorded as an audio sample for the user identity information in the first stage. The user may then read aloud their multi-choice answer for one or more questions in the test with this forming the user identity information in the second stage. It can be seen that the corresponding audio samples can be compared to verify similarity within a threshold and, therefore, verify identity of the user during the interaction.

In one embodiment, user identity information is captured at a third stage. The capture may occur in a different location, at a different time (e.g. not proximate in time to the interaction), and/or on a different device. Further verification of the user may occur by using the user identity information captured at the third stage and either/both of the user identity information captured at the first and second stages.

Figure 4:
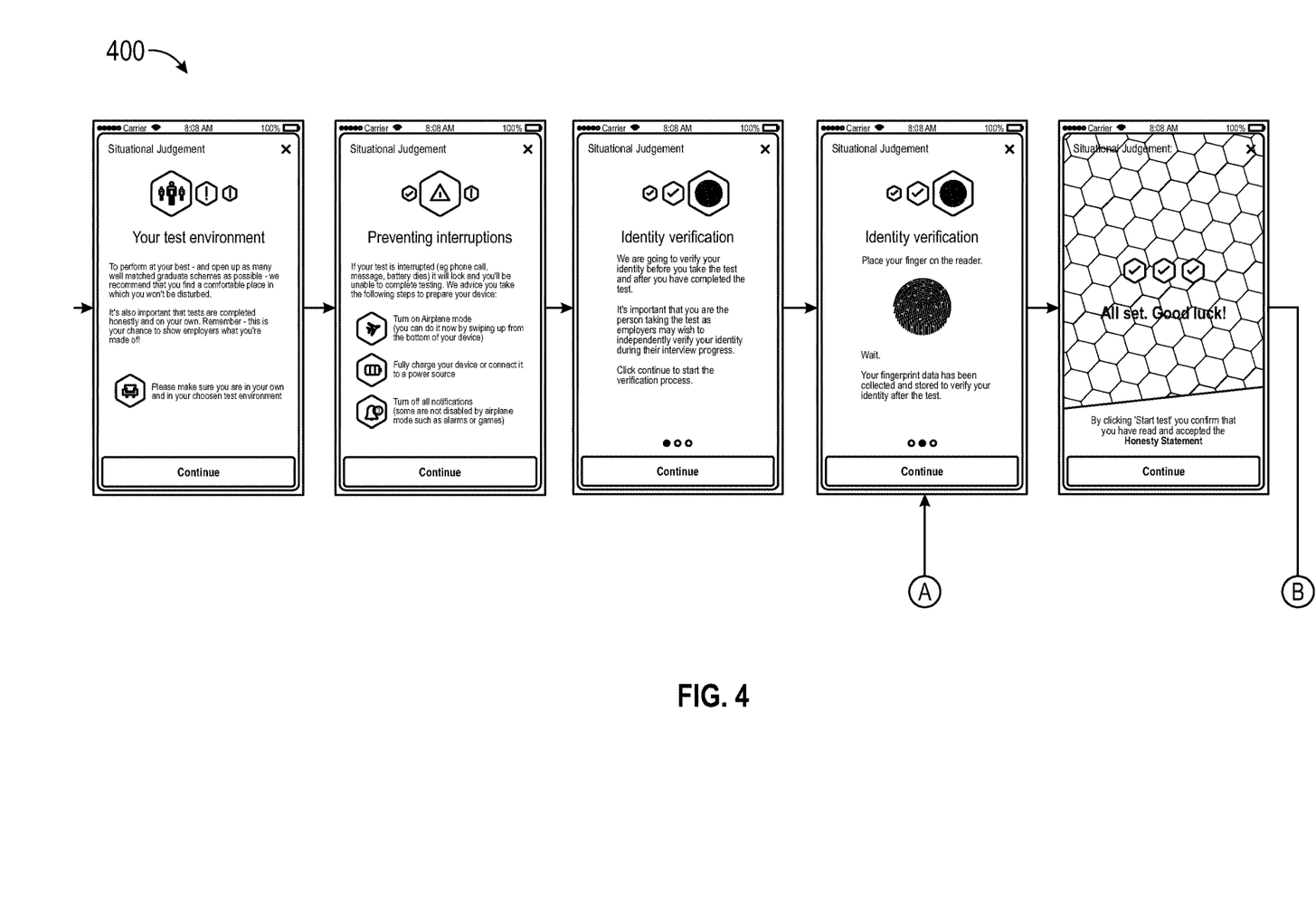
FIG. 4: shows a flow diagram with screenshots from a device illustrating a method of an embodiment of the invention.

FIG. 4 shows a flow diagram with screenshots on a device illustrating a method of the invention where identity verification is provided via a fingerprint reader.

In step 400, the user is instructed to place their finger on the fingerprint reader (e.g. biometric module 104a) and the fingerprint is read.

In step 401, a test is provided to the user on the device.

In step 402, the user is again instructed to place their fingerprint on the fingerprint reader and the fingerprint is read a second time.

In step 403, both the first reading and the second reading may be verified to ensure that the user is the same person.

In step 404, the readings may be transmitted for external verification.

Figure 5:
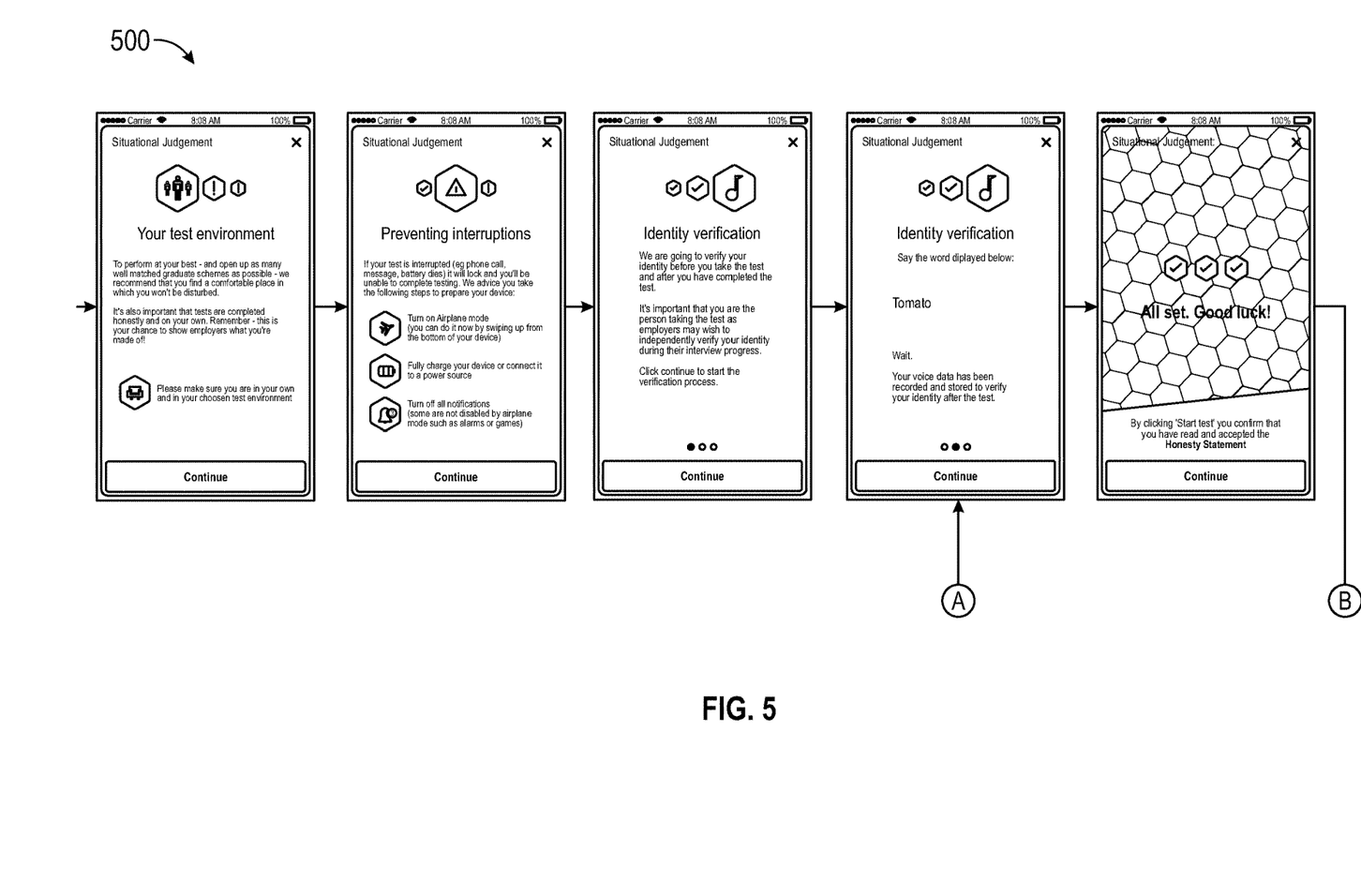
FIG. 5: shows a flow diagram with screenshots from a device illustrating a method of an embodiment of the invention.

FIG. 5 shows a flow diagram with screenshots on a device illustrating a method of the invention where identity verification is provided via audio matching.

In step 500, the user is instructed to read out a keyword: "Tomato". The keyword is recorded by a microphone (e.g. biometric module 4a) and stored.

In step 501, a test is provided to the user on the device.

In step 502, following completion of test, the user is instructed to read out a keyword: "Tomato" for a second time. The keyword is recorded by a microphone (e.g. biometric module 4a) and stored.

In step 503, both the first recording and the second recording may be verified to ensure that the user is the same person.

In step 504, the recordings may be transmitted for external verification.

A potential advantage of some embodiments of the present invention is that user identity during an interaction can be more accurately proved and, therefore, that interaction can be validated for that user.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for identification verification for a device including, at the device:
   a biometric capture device capturing user identity information at a first stage immediately prior to an interaction at the device;
   the biometric capture device capturing user identity information at a second stage immediately following the interaction; and
   a processor verifying identity during the interaction by comparing the user identity information captured at the first stage with the user identity information captured at the second stage,
   wherein the interaction is a test executing on the device or one or more questions within the test, and the first stage, the interaction and the second stage are part of a continuous usage period of the device by the user.

2. A method as claimed in claim 1, wherein the test is a psychometric test.

3. A method as claimed in claim 1, wherein the user identity information is one or more of a fingerprint of the user, a photograph or video of the user, or a voice recording of the user.

4. A method as claimed in claim 3, further including the steps of:
   displaying an alphanumeric, a word or phrase for the user to speak; and
   recording the voice of the user reading the alphanumeric, word or phrase as the user identity information.

5. A method as claimed in claim 4, wherein the alphanumeric, word or phrase is randomly selected or generated.

6. A method as claimed in claim 4, wherein the alphanumeric, word or phrase is an answer from the user to a question in a test.

7. A method as claimed in claim 1, further including the step of recording the verified identity with the interaction.

8. A method as claimed in claim 7, wherein the recorded verified identity is stored at a server.

9. A method as claimed in claim 1, further including the steps of:
   capturing user identity information at a third stage; and
   verifying identity of the user using information captured at the third stage and
   either of the first or second stages.

10. A method as claimed in claim 9, wherein the user identity information captured at the third stage is captured at a second device.

11. A method as claimed in claim 9, wherein the third stage occurs in a different location to the first and second stages.

12. A method as claimed in claim 1, wherein the biometric capture device comprises a fingerprint reader, a camera and/or a microphone.

13. A method as claimed in claim 1, further comprising a location device capturing location information of the device at a time the user identity information is captured at the first stage and at a time the user identity information is captured at the second stage.

14. A method as claimed in claim 1, wherein the interaction includes a plurality of questions and identity verification is performed a plurality of times during the interaction.

15. A method as claimed in claim 1, further including the steps of:
   capturing, using the biometric capture device, user identity information at a third stage that is not proximate in time to the interaction; and
   verifying identity of the user using user identity information captured at the third stage, the first stage and the second stage.

16. A device for identification verification, including:
   a processor configured to capture user identity information immediately prior to an interaction at a biometric capture device, to capture user identity information immediately following the interaction at the biometric capture device, and to use the information captured to verify the identity of the user during the interaction by comparing the user identity information captured prior to the interaction with the user identity information captured following the interaction, wherein the interaction is a test executing on the device or one or more questions within the test, and capturing the user identity information immediately prior to the interaction, the interaction and capturing the user identity information captured following the interaction are part of a continuous usage period of the device by the user; and a memory configured to store the user identity information captured prior to the interaction and the user identity information captured following the interaction.

17. A non-transitory computer readable medium configured to store a computer program which when executed on a device:

captures, from a biometric capture device, user identity information at a first stage immediately prior to an interaction at the device;

captures, from the biometric capture device, user identity information at a second stage immediately following the interaction; and verifies identity during the interaction by comparing the user identity information captured at the first stage with the user identity information captured at the second stage, wherein the interaction is a test executing on the device or one or more questions within the test, and the first stage, the interaction and the second stage are part of a continuous usage period of the device by the user.

* * * * *